United States Patent
Lambert et al.

(10) Patent No.: US 11,951,643 B2
(45) Date of Patent: Apr. 9, 2024

(54) MITER SAW

(71) Applicant: BLACK & DECKER INC., New Brtiain, CT (US)

(72) Inventors: Torrey Rea Lambert, White Hall, MD (US); HuaMing Yao, Suzhou (CN); Chao Bu, Suzhou (CN); Fei Zhou, Suzhou (CN)

(73) Assignee: BLACK & DECKER INC., New Britain, CT (US)

( * ) Notice: Subject to any disclaimer, the term of this patent is extended or adjusted under 35 U.S.C. 154(b) by 0 days.

(21) Appl. No.: 17/662,347

(22) Filed: May 6, 2022

(65) Prior Publication Data
US 2022/0362961 A1    Nov. 17, 2022

Related U.S. Application Data

(60) Provisional application No. 63/187,027, filed on May 11, 2021.

(51) Int. Cl.
*B27B 27/06* (2006.01)
*B23D 45/04* (2006.01)
*B23D 47/02* (2006.01)

(52) U.S. Cl.
CPC ............ *B27B 27/06* (2013.01); *B23D 45/048* (2013.01); *B23D 47/025* (2013.01)

(58) Field of Classification Search
CPC ... B27B 5/29; Y10T 83/7697; Y10T 83/8773; Y10T 83/7788; Y10T 83/7726; Y10T 83/7705; B23D 47/025; B23D 47/02; B23D 45/048; B23D 45/044
See application file for complete search history.

(56) References Cited

U.S. PATENT DOCUMENTS

| | | | | |
|---|---|---|---|---|
| 6,016,732 A | * | 1/2000 | Brault | B23D 45/048 83/477.1 |
| 6,810,780 B2 | * | 11/2004 | Ceroll | B23D 45/048 83/490 |
| 7,267,039 B2 | | 9/2007 | Liao et al. | |
| 7,752,950 B2 | | 7/2010 | Hu | |

(Continued)

FOREIGN PATENT DOCUMENTS

| | | |
|---|---|---|
| DE | 202004005085 U1 | 8/2005 |
| EP | 1129814 B1 | 4/2004 |

(Continued)

*Primary Examiner* — Laura M Lee
(74) *Attorney, Agent, or Firm* — Adan Ayala

(57) ABSTRACT

A miter saw has a base having a detent notch, a table rotatably connectable to the base, a pivoting assembly connected to the table, and a saw assembly supported by the pivoting assembly. The saw assembly has a blade movable downwardly for a cutting operation. A locking mechanism is disposed on the table. The locking mechanism is movable between an unlocked position and a locked position for selectively unlocking and locking the table for rotational movement relative to the base about the miter axis. The locking mechanism has a lock lever rotatably connected to the table. The lock lever has a handle for moving locking mechanism between the locked and unlocked positions. The saw also has a miter detent assembly for selectively engaging and disengaging the detent notch.

10 Claims, 3 Drawing Sheets

(56) References Cited

U.S. PATENT DOCUMENTS

| | | | |
|---|---|---|---|
| 7,938,050 B2* | 5/2011 | Gehret | B23D 47/025 |
| | | | 83/471 |
| 8,209,872 B1 | 7/2012 | Ende | |
| 8,752,461 B2 | 6/2014 | Oberheim et al. | |
| 8,776,656 B2 | 7/2014 | Weusthof | |
| 9,126,274 B2 | 9/2015 | Firth | |
| 9,498,831 B2 | 11/2016 | Sasaki et al. | |
| 9,662,724 B1* | 5/2017 | Knight | B23D 47/025 |
| 9,868,167 B2 | 1/2018 | Doumani et al. | |
| 10,099,301 B2* | 10/2018 | Chiang | B23D 45/048 |
| 10,144,143 B2 | 12/2018 | Firth | |
| 10,213,853 B2 | 2/2019 | Doumani et al. | |
| 10,688,571 B2* | 6/2020 | Chen | B23D 47/025 |
| 2002/0166433 A1* | 11/2002 | Ceroll | B27B 5/29 |
| | | | 83/477.1 |
| 2005/0098010 A1 | 5/2005 | Hu | |
| 2006/0249000 A1* | 11/2006 | Meredith | B23D 45/046 |
| | | | 83/490 |
| 2007/0157782 A1* | 7/2007 | Hetcher | B23D 45/048 |
| | | | 83/490 |
| 2007/0214928 A1* | 9/2007 | Wikle | B23D 47/025 |
| | | | 83/477.1 |
| 2013/0263712 A1* | 10/2013 | Xu | B23D 45/044 |
| | | | 83/471.3 |
| 2019/0232520 A1 | 8/2019 | Chang | |
| 2022/0362961 A1* | 11/2022 | Lambert | B23D 47/025 |

FOREIGN PATENT DOCUMENTS

| | | |
|---|---|---|
| EP | 1400297 B1 | 6/2006 |
| EP | 1533064 B1 | 5/2007 |

* cited by examiner

MITER SAW

FIELD

The present invention generally relates to power tools used for cutting work pieces, and more specifically relates to sliding miter saws.

BACKGROUND

During construction, manufacturing, and assembly operations, pieces of material such as wood, plastic, and metal (i.e. work pieces) must be cut to exact lengths, shapes, and dimensions. In many instances, power equipment and saws are used for cutting these work pieces. One type of saw, commonly referred to as a miter saw, has a cutting blade, a motor for driving the cutting blade, a horizontally-extending table, and a vertically-extending fence that cooperates with the table to support the work pieces during cutting operations. The horizontally-extending table provides a horizontal support surface for the work pieces, and the fence provides a vertical support surface for the work pieces. The cutting blade of a conventional miter saw is rotatable about a vertically-extending axis for making vertical cuts at various angles relative to the vertical support surface of the fence. These vertical cuts are typically referred to as miter cuts.

In many designs, the work piece-supporting fence is divided into two parts that are separated from one another by a gap, and the cutting blade is adapted to pass through the gap during a cutting operation. Each of the two fence parts has a vertically-extending support surface, and the two support surfaces lie in a common plane. The two fence parts may be movable relative to one another for adjusting the gap space between the two fence parts.

In addition to conventional miter saws used to make vertical cuts, there are other types of miter saws that are used to make even more complex cuts. For example, a compound miter saw has a cutting blade that may be tilted at an angle relative to the horizontally-extending table, generally from 0 degrees to 45 degrees left of vertical. A cut made with the blade tilted at an angle to the horizontally-extending table, while remaining perpendicular to the front face of the fence, is known as a "bevel cut." A cut made with the blade set at an angle relative to the front face of the fence (miter angle) and at an angle relative to the base (bevel angle) is known as a "compound cut."

Another type of miter saw is commonly referred to as a dual bevel compound miter saw, which has a tiltable structure that enables the cutting blade to be positioned at a range of angles relative to the table from 45 degrees left of vertical to 45 degrees right of vertical. This arrangement allows for even more "compound cut" variations.

Still another type of miter saw is a slide miter saw including a rail system that enables the saw component to slide backward and forward over the table so as to increase the saw's cutting capabilities (see, e.g., U.S. Pat. No. 6,067,885). Like non-sliding miter saws, slide miter saws have a base, a rotatable table attached to the base, a saw assembly including a motor, and a blade driven by the motor. The saw assembly is coupled with the table through a pivot arm that enables the saw assembly to be pivoted downwardly toward the table for cutting a work piece disposed on the table.

In some instances, an operator may want to limit or stop sliding movement of the cutting assembly between the front and rear ends of the table. For example, DE 3 744 716 discloses a circular saw for a wood working bench having a cutting assembly that is connected with guide rails that enable the cutting assembly to slide in forward and rear directions relative to a cutting surface of a table. The circular saw includes a housing having openings through which the guide rails are adapted to slide. The guide rails are stopped from sliding by a locking element that engages one of the slide rails. When it is desired to once again slide the cutting assembly forwardly or rearwardly, the locking element may be loosened.

DESCRIPTION OF THE DRAWINGS

Preferred embodiments of the invention will now be described, by way of example, with reference to the accompanying drawings, of which.

DETAILED DESCRIPTION

Figure 1:
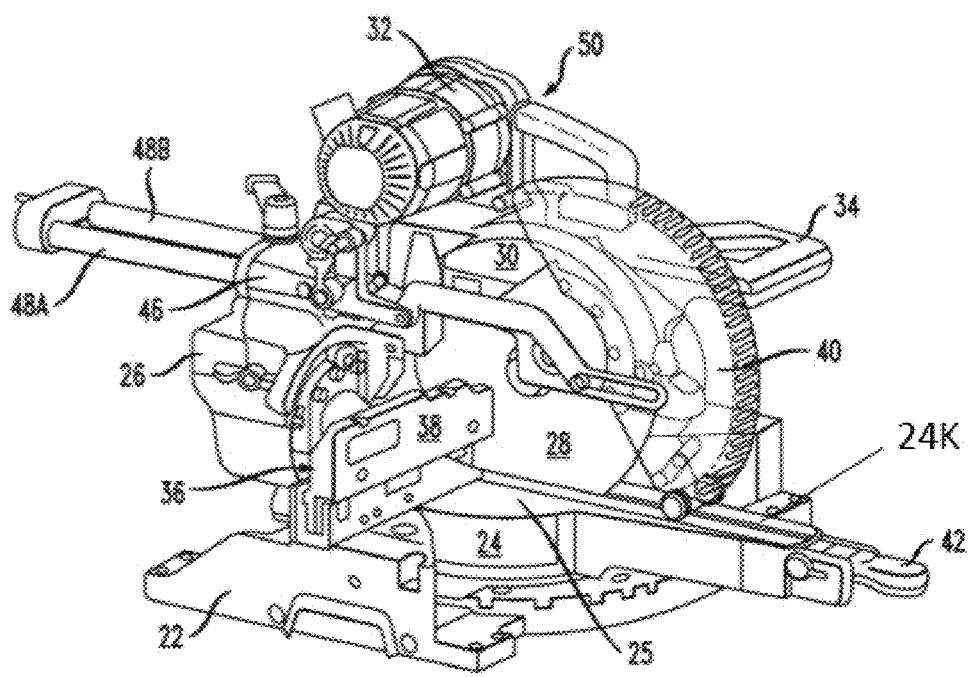
FIG. 1 shows a perspective view of a miter saw.

The headings used herein are for organizational purposes only and are not meant to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. For purposes of clarity, and in order to described one or more embodiments of the present invention, terms such as "vertical," "horizontal," "perpendicular," "parallel," "front," "rear," "trailing," "leading," "first end," and "second end" have been used herein. Such terms are merely used to provide a frame of reference for the embodiments shown in the drawings and are not intended to limit the scope of the present invention.

Persons skilled in the art are referred to U.S. Pat. No. 9,707,633, entitled "Miter Saws Having Locking Assemblies for Optimal Positioning of Cutting Blades," filed on Apr. 16, 2013, which is fully incorporated by reference herein. Referring to FIG. 1, a miter saw 20 includes a base 22, and a table 24 rotatably coupled with the base 22 for being selectively rotated to a plurality of different angles for miter cutting. The table 24 has a top surface 25 that preferably extends in a substantially horizontal direction for supporting a work piece during a cutting, sizing, or shaping operation. The miter saw 20 also desirably includes a compound pivot and slide mounting linkage 26, a cutting blade 28, a fixed blade guard 30 covering an upper part of the cutting blade 28, a motor 32 drivingly connected to the cutting blade 28, a handle 34, and an adjustable fence assembly 36 including a first fence section 38 and a second fence section (not shown).

The miter saw 20 also has a moveable blade guard 40 that covers a front of the cutting blade 28 and that is adapted to slide over the fixed blade guard 30 as the cutting blade is lowered toward the table 24. The rotation of the table 24 changes the angle of the cutting blade 28 relative to the fence assembly 36, but maintains the cutting blade 28 perpendicular to the horizontally-extending top surface of the table 24. A locking mechanism 42 is movable between an unlocked position and a locked position for selectively unlocking and locking the table 24 for rotational movement relative to the base 22.

The compound pivot and slide mounting linkage 26 preferably couples the cutting blade 28 with the table 24, and includes a pivoting structure that enables the cutting blade 28 to be pivoted with respect to the table 24 in order to provide adjustments for bevel cutting. As is well-known by those skilled in the art, the adjustments for mitering and beveling can be separate or they can be adjusted simultaneously in order to provide compound miter and bevel cuts. The pivoting of the compound pivot and slide mounting linkage 26 changes the angle of the cutting blade 28 relative to the table 24, but maintains the perpendicularity of the cutting blade 28 with respect to the adjustable fence assembly 36. One or more locking mechanisms may be engaged in order to lock the compound pivot and slide mounting linkage 26 from further movement relative to the table 24. Thus, the cutting blade 28 may be locked at a plurality of different bevel angles, and the angle will not change so long as the one or more locking mechanisms remain locked.

The compound pivot and slide mounting linkage 26 includes a support housing 46 provided at an upper end thereof that is adapted to receive a pair of guide rails 48A, 48B for enabling forward and rearward sliding movement of a cutting assembly 50 that includes the cutting blade 28, the fixed blade guard 30, the motor 32 and the handle 34. The cutting assembly 50 may be pivoted downwardly toward the horizontally-extending top surface 25 of the table 24. This downward pivoting action opens the movable blade guard 40 to expose the cutting blade 28. After the cutting blade has been exposed, it may be used to cut work pieces supported by the top surface 25 of the table 24 and the fence 36. The sliding movement of the guide rails 48 relative to the support housing 46 enables the cutting assembly 50 and thus the cutting blade 28 to be pulled through the work pieces, including those instances where the size of the work piece exceeds the cutting width of the cutting blade.

Figure 3:
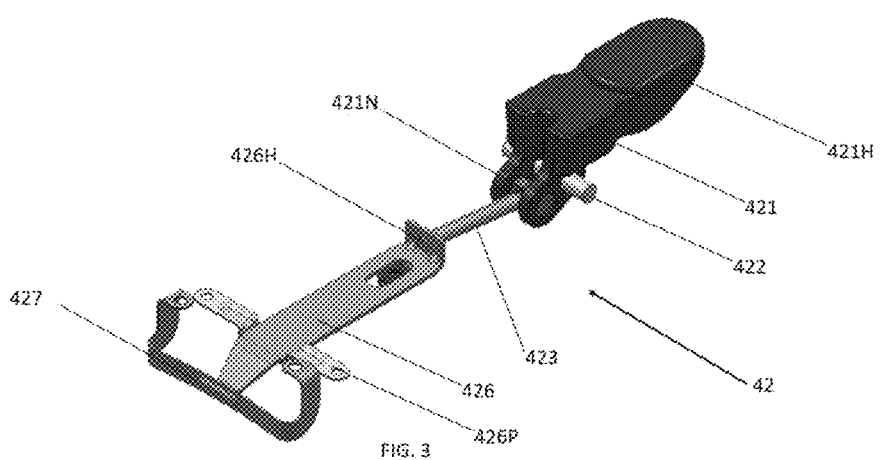
FIG. 3 is a perspective view of the locking mechanism of FIGS. 2A-2B.
Figure 2A:
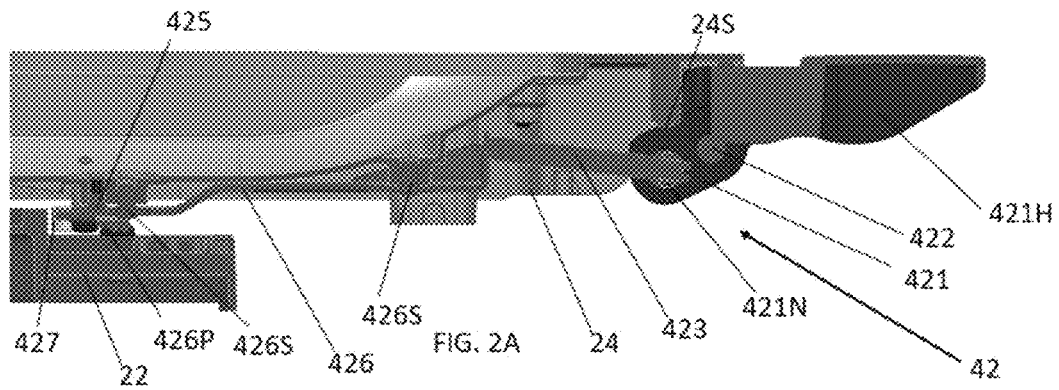
FIGS. 2A-2B are cross-sectional views of a locking mechanism shown in an unlocked position and a locked position, respectively.
Figure 2B:
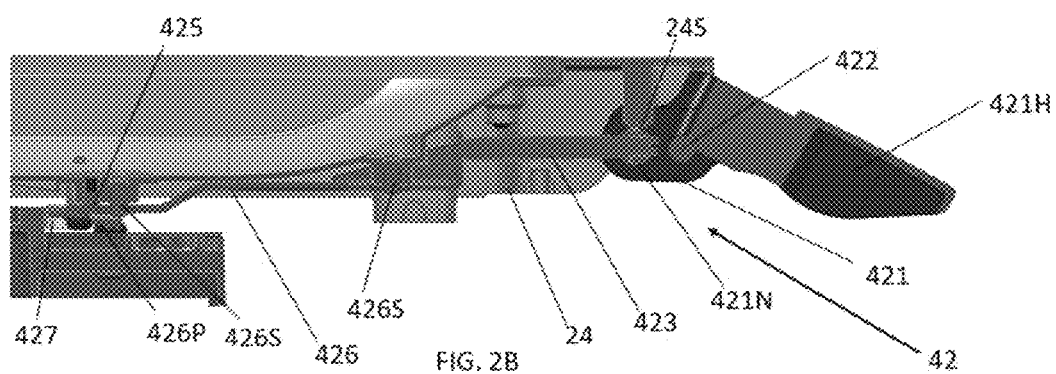

Referring to FIGS. 1-3, locking mechanism 42 is movable between an unlocked position and a locked position for selectively unlocking and locking the table 24 for rotational movement relative to the base 22. Locking mechanism 42 preferably has a lock lever 421 rotatably connected to the table 24 through a pivot pin 422. Lock lever 421 preferably has a handle 421H that can be grabbed by the user for shifting locking mechanism 42 between the locked and unlocked positions.

A rod 423 is connected to the lock lever 421. Rod 423 may be connected to the lock lever 421 via a nut 421N captured within lock lever 421. Preferably rod 423 is threadingly engaged to nut 421N.

The rod 423 contacts rod extension 426. Preferably rod extension 426 has a hole 426H for receiving and locating the rod 423. Rod extension 426 contacts clamping plate 427. Preferably the clamping plate 427 serves as a spring component that provides a spring force to push the rod extension 426 towards the lock lever 421, biasing lock lever 421 towards the unlocked position. Clamping plate 427 may be secured to table 24 by screws.

Rod extension 426 may be slidingly held under the bottom of the table 24 by a retainer plate 426P (which may be fixedly attached to table 24 via screws) and screws 426S.

Persons skilled in the art shall recognize that, since rod extension 426 is captured by retainer plate 426P and the screws 426S, rod extension 426 can only slide towards and away from clamping plate 427 (and base 22).

An adjustment pin 425 may be disposed between table 24 and rod extension 426 for taking up any vertical clearance (and play) of rod extension 426. Preferably pin 425 may be threadingly engaged to table 24 and can be adjusted by rotating pin 425. Alternatively pin 425 may be spring-loaded and captured between table 24 and rod extension 426, taking up any play therebetween.

Such arrangement requires less vertical space underneath the table 24. Persons skilled in the art shall recognize that locking mechanism 42 (or at least the force applied by clamping plate 427) can be aligned with the miter axis of table 24 and/or the line along the intersection of blade 28 and top surface 25 (i.e., the line of cut), thus increasing the cutting accuracy of the miter saw 20.

To lock the locking mechanism 42, the user would rotate the handle 421H downwardly, thus rotating lock lever 421 about pivot pin 422. Such rotating causes nut 421N to move upwardly, which in turn causes rod 423 to move towards base 22.

Rod 423 in turn pushes the rod extension 426 to move the clamping plate 427 into contact with base 22. Such contact generates a clamping force between clamping plate 427 and base 22, preventing table 24 from rotating against base 22.

Persons skilled in the art shall recognize that the center point of pivot pin 422 will be lower than the center point of the nut 421N in the locked position. In addition, nut 421S may contact a stop surface 24S of table 24. Such arrangement will preferably create a stable position, keeping the locking mechanism 42 in the locked position.

In order to unlock the locking mechanism 42, the user would rotate the handle 421H upwardly, thus rotating lock lever 421 about pivot pin 422. Such rotating causes nut 421N to move downwardly. Because of the spring force of clamping plate 427, rod extension 426 and rod 423 move away from base 22.

Figure 4A:
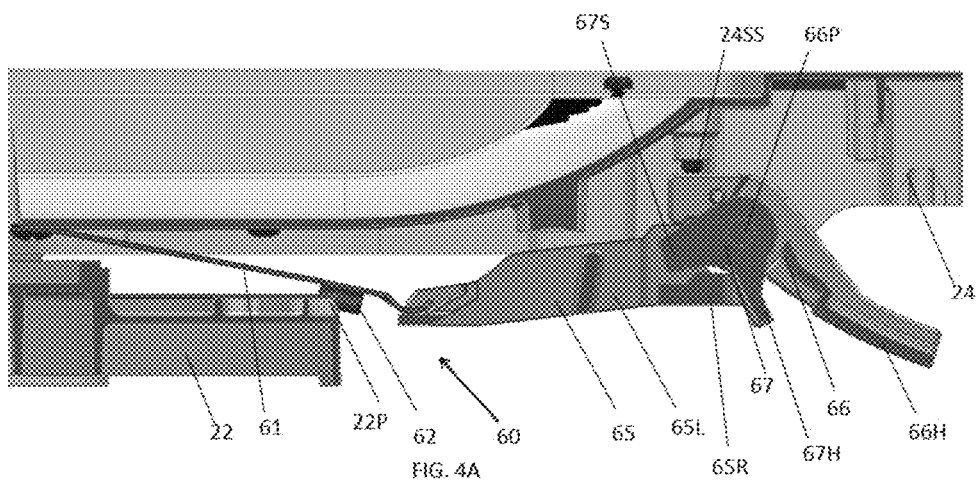
FIGS. 4A-4B are cross-sectional views of a miter detent mechanism shown in an unlocked position and a locked position, respectively.
Figure 4B:
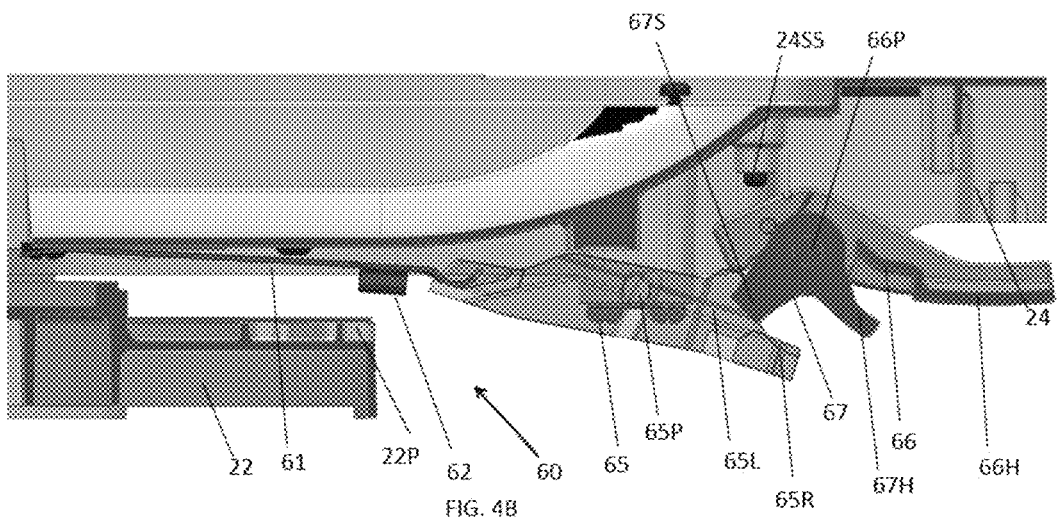

Referring to FIGS. 4A-4B, the base 22 preferably has a detent plate 22P attached thereto with notches (not shown). Persons skilled in the art are referred to U.S. Pat. No. 7,992,478, which is wholly incorporated herein by reference, for further information on detent plate 22P and other elements of typical miter detent mechanisms.

A miter detent assembly 60 may be pivotably attached to table 24. Miter detent assembly 60 preferably includes a body 61, with a detent portion 62 that engages a notch in detent plate 22P. Persons skilled in the art shall recognize that that body 61 may be a resilient plate, biasing detent portion 62 towards engagement with detent plate 22P. Alternatively a spring (not shown) may be disposed between table 24 and body 61 (as shown in U.S. Pat. No. 7,992,478), biasing detent portion 62 towards engagement with detent plate 22P.

Miter saw 20 has a detent override assembly 65 to move detent portion 62 from a first position engaging notch (where the table 24 cannot be rotated relative to base 22) and a second position not engaging notch (allowing table 24 to rotate relative to base 22). Persons skilled in the art are referred to the detent override assembly described in U.S. Pat. No. 6,810,780, which is fully incorporated herein by reference.

Detent override assembly 65 may have a lever 65L pivotally attached to table 24, and an actuator 66 pivotally attached to table 24. Actuator 66 may have a handle 66H that can be manipulated by the user.

When the user moves handle 66H upwardly, the actuator 66 rotates about pin 66P, causing lever 65L to rotate about pin 65P. As lever 65L rotates, it moves body 61 (and thus detent portion 62) from the position engaging the notch in detent plate 22P (where the table 24 cannot be rotated relative to base 22) to the second position where detent portion 62 is not engaging the notch in detent plate 22P (thus allowing table 24 to rotate relative to base 22).

When the user releases handle 66H, the body 61 moves toward detent plate 22P due to the spring bias. If detent portion 62 is aligned with the notch in detent plate 22P, detent portion 62 will engage such notch, fixing the rotational position of table 24 relative to base 22. If detent portion 62 is not aligned with the notch in detent plate 22P, detent portion 62 will contact detent plate 22P but not engage the notch in detent plate 22P. Because the rotational position of table 24 is not fixed relative to base 22, the user can still rotate table 24 relative to base 22, until detent portion 62 drops into and engages the notch in detent plate 22P.

The downward movement of body 61 and detent portion 62 towards detent plate 22P causes lever 65L to rotate about pin 65P, which in turn causes actuator 66 to rotate. Table 24 may have a stop 24SS to limit the rotation of actuator 66. Persons skilled in the art shall recognize that such stop 24SS is preferably adjustable.

A detent override mechanism 67 may also be provided to ensure that body 61 is in the second position, so that detent portion 62 cannot drops into and engages the notch in detent plate 22P. Referring to FIGS. 4A-4B, detent override mechanism 67 may be disposed on and rotatable about pin 66P. Detent override mechanism 67 preferably has a handle 67H so the user can rotate detent override mechanism 67 towards the handle 66H. Persons skilled in the art shall recognize that, in such position, a protrusion 67S can contact a ledge 65R. In such position, the detent override mechanism 67 will prevent lever 65L to rotate, maintaining body 61 (and thus detent portion 62) in the second position.

Figure 5:
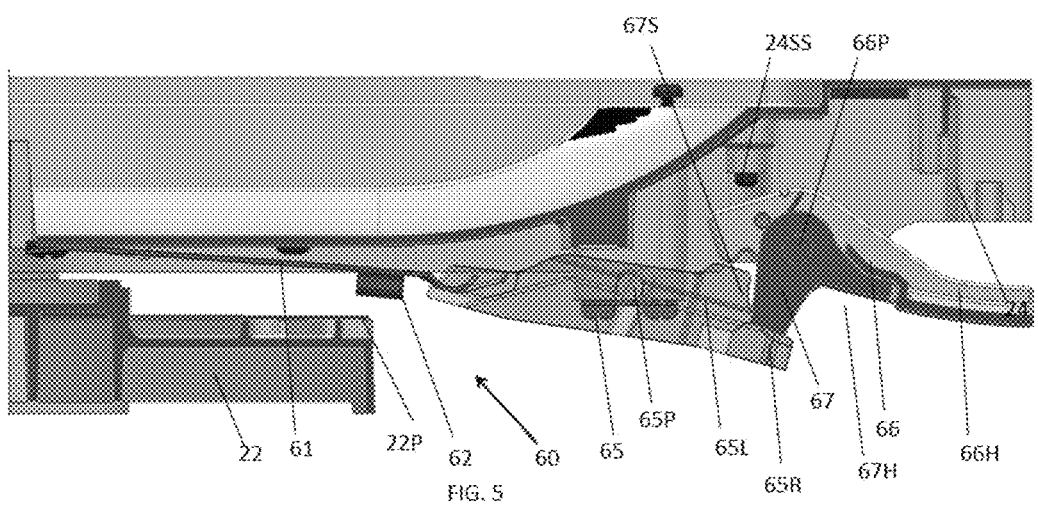
FIG. 5 is a cross-sectional view of the miter detent mechanism of FIGS. 4A-4B, where a detent override mechanism is shown in the engaged position.

Preferably detent override mechanism 67 has a spring (not shown) that biases the detent override mechanism 67 towards the position(s) shown in FIGS. 4A-4B instead of the engaged position of FIG. 5. Preferably such spring is a torsion coil spring that is attached to detent override mechanism 67 at one end and wrapped around pin 66P. Accordingly, if the user were to move handle 66H upwardly, the spring would rotate the detent override mechanism 67 towards the position(s) shown in FIGS. 4A-4B, allowing the body 61 (and thus detent portion 62) to move toward detent plate 22P when the user releases handle 66H.

Figure 6:
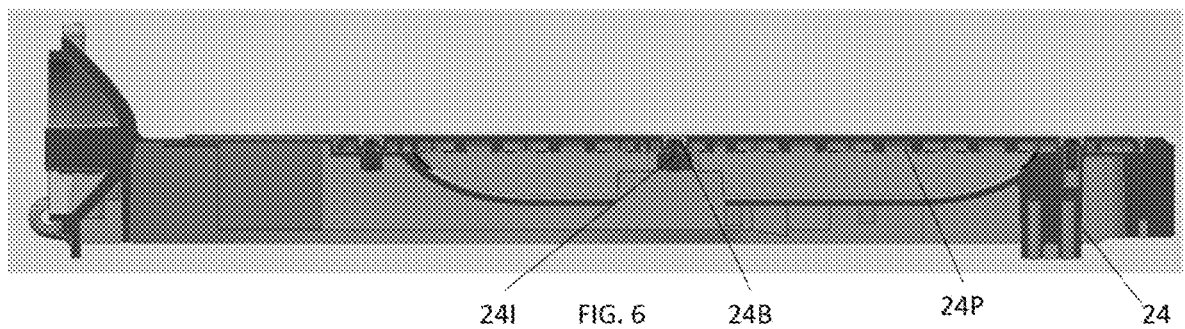
FIG. 6 is a cross-sectional view of the table.

Referring to FIGS. 1 and 6, table 24 may have a kerf plate 24P, which can be removed to remove debris under kerf plate 24P caused by the cutting application. Kerf plate 24P may be held attached to table 24 by a screw 24B threadingly attached to table 24.

Typically table 24 and screw 24B are made of aluminum and steel respectively. Because steel is harder than aluminium, threading screw 24B into table 24 may damage the thread within table 24.

It is thus preferable to provide table 24 with insert(s) 241 made of steel, which would threadingly received screw 24B. Insert(s) 241 may be fixedly attached to table 24 via a press fit, riveting, a threaded connection, etc.

It will be understood that the above description and the drawings are examples of particular implementations of the invention, but that other implementations of the invention are included in the scope of the claims.

What is claimed is:

1. A miter saw comprising:
   a base having a detent notch;
   a table rotatably connectable to the base, the table being rotatable about a substantially vertical miter axis and having a substantially horizontal workpiece-supporting plane;
   a pivoting assembly connected to the table;
   a saw assembly supported by the pivoting assembly, the saw assembly comprising a blade, the blade being movable for a cutting operation downwardly from a first position where the blade is above the workpiece-supporting plane to a second position where a portion of the blade is below the workpiece-supporting plane;
   a fence connected to the base assembly, the fence defining a fence plane perpendicular to the workpiece-supporting plane;
   a locking mechanism disposed on the table, the locking mechanism being movable between an unlocked position and a locked position for selectively unlocking and locking the table for rotational movement relative to the base about the miter axis, the locking mechanism comprises a lock lever rotatably connected to the table, the lock lever having a handle for moving locking mechanism between the locked and unlocked positions, a rod connected to the lock lever, a rod extension slidingly movable towards the table, the rod extension contacting the rod, and a clamping plate disposed between the table and the rod extension, wherein the clamping plate contacts the base and the rod extension when the locking mechanism is in the locked position; and
   a miter detent assembly for selectively engaging and disengaging the detent notch;
   wherein a force applied by the clamping plate when the locking mechanism is in the locked position is aligned with at least one of the miter axis and a line along the intersection of blade and the workpiece-supporting plane.

2. The miter saw of claim 1, wherein the miter detent assembly is pivotably attached to the table.

3. The miter saw of claim 2, wherein the miter detent assembly comprises a body attached to the table, the body having a detent portion, and a detent override assembly for moving the detent portion from a first position engaging the detent notch and a second position not engaging the detent notch, the detent override assembly comprising a lever pivotally attached to the table and contacting the body, and an actuator pivotally attached to the table and contacting the lever.

4. The miter saw of claim 3, wherein the actuator has a handle.

5. The miter saw of claim 3, wherein the miter detent assembly further comprises a detent override mechanism for maintaining the body in the second position when the detent override mechanism is activated.

6. The miter saw of claim 5, wherein the actuator is pivotably connected to the table via a pin.

7. The miter saw of claim 6, wherein the detent override mechanism is pivotably disposed on the pin.

8. The miter saw of claim 7, wherein the detent override mechanism has a handle.

9. The miter saw of claim 5, wherein the detent override mechanism contacts the lever.

10. The miter saw of claim 1, further comprising a plurality of guide rails slidingly disposed on the pivoting assembly and connected to the saw assembly.

* * * * *